(12) United States Patent
Hung et al.

(10) Patent No.: US 7,686,514 B2
(45) Date of Patent: Mar. 30, 2010

(54) WIPER FOR LINEAR MOTION GUIDE APPARATUS

(75) Inventors: Shih-Hsin Hung, Taichung (TW); Tsung-Jen Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 559 days.

(21) Appl. No.: 11/732,725

(22) Filed: Apr. 4, 2007

(65) Prior Publication Data
US 2008/0247688 A1 Oct. 9, 2008

(51) Int. Cl.
*F16C 33/76* (2006.01)
*F16C 29/06* (2006.01)
(52) U.S. Cl. .......................................... 384/15; 384/45
(58) Field of Classification Search ................... 384/15, 384/45
See application file for complete search history.

(56) References Cited

U.S. PATENT DOCUMENTS

| 5,634,722 | A | 6/1997 | Yuasa et al. | 384/15 |
| 6,106,154 | A * | 8/2000 | Agari | 384/15 |
| 6,558,039 | B2 * | 5/2003 | Wu | 384/45 |
| 6,652,146 | B2 | 11/2003 | Lee | 384/45 |
| 7,121,724 | B2 | 10/2006 | Lee et al. | 384/45 |
| 2004/0146228 | A1 * | 7/2004 | Lee et al. | 384/45 |

* cited by examiner

*Primary Examiner*—Thomas R Hannon
(74) *Attorney, Agent, or Firm*—Charles E. Baxley

(57) ABSTRACT

A linear motion guide device includes a slider slidably attached onto a guide rail, an end cap and a wiper device attached to each side of the slider, the wiper device includes two wiping members to be easily and detachably attached to each of the end cap without tools and fasteners. The wiping members each include one or more projections or one or more latches for engaging with the end cap and for anchoring and positioning the wiping members to the end cap without tools and fasteners. The end cap includes a space separated into two chambers and for receiving the wiping members respectively. The wiping members each include a soft wiping portion for resiliently engaging with the guide rail.

16 Claims, 8 Drawing Sheets

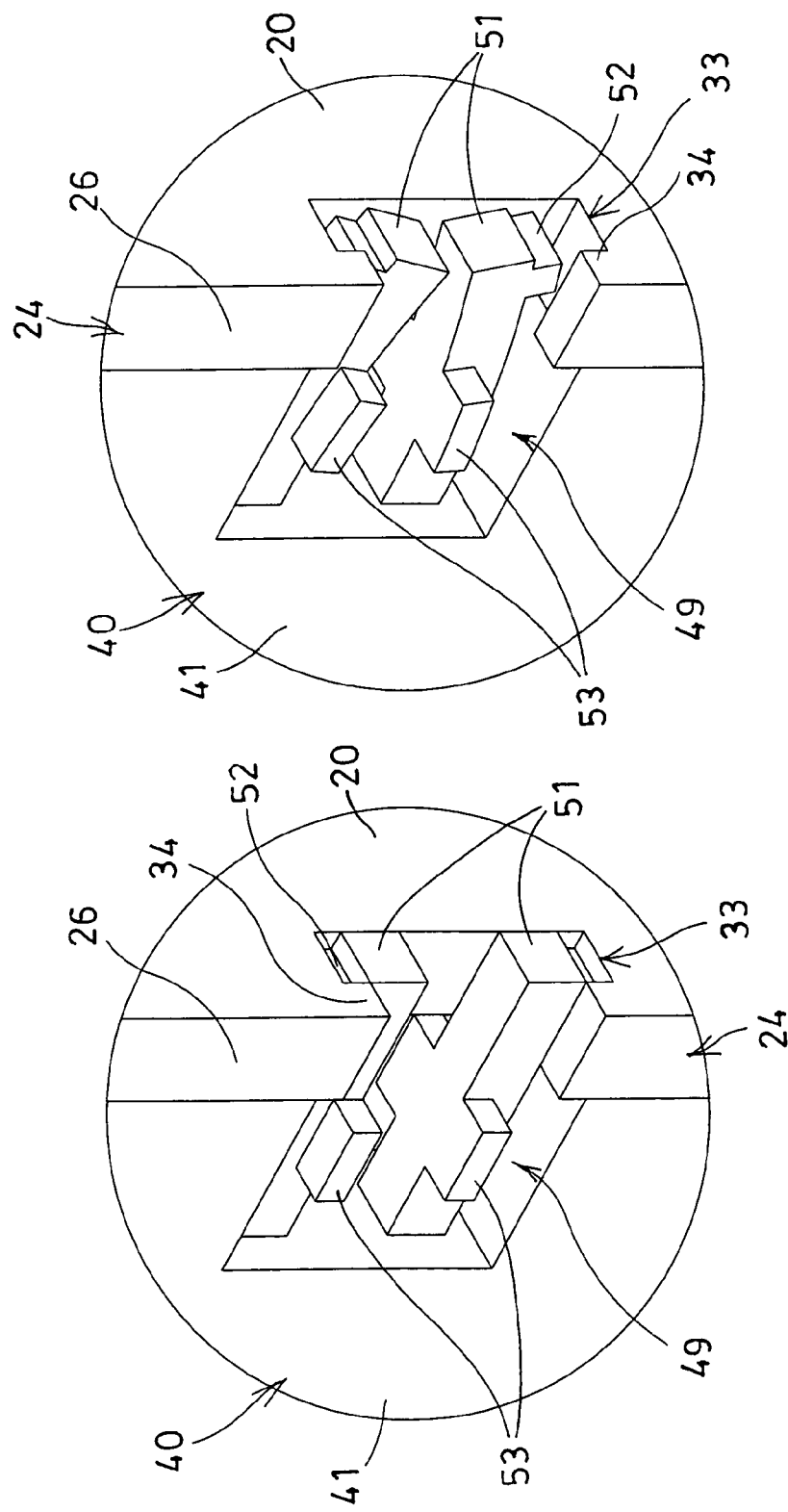

WIPER FOR LINEAR MOTION GUIDE APPARATUS

BACKGROUND OF THE INVENTION

1. Field of the Invention

The present invention relates to a linear motion guide apparatus, and more particularly to a linear motion guide apparatus including a wiper designed and arranged to be easily and readily attached to or disengaged from the linear motion guide apparatus without additional tools.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 5,634,722 to Yuasa et al. discloses one of the typical linear motion rolling guide units comprising a slider or slide block slidably attached onto a guide rail, and one or more end seals or wiper devices attached onto the slide block or the end caps and having a soft rubber lips or lip portions for engaging with the guide rail and for making a tight seal between the slide block and the guide rail and for wiping off the dust or particles or the like that may be engaged into the space formed between the slide block and the guide rail.

However, the dust proof wipers or end seals are solidly secured onto the end cap or the slide block with four or more fasteners, and it will also take a long time to fasten and to unfasten the fasteners onto and from the dust proof seal. In addition, the dust proof wipers or end seals should be slightly bent or twisted for allowing the dust proof wipers or end seals to be attached onto and engaged with the guide rail.

U.S. Pat. No. 6,652,146 to Lee discloses another typical linear motion rolling guide device also comprising a slider or slide block slidably attached onto a guide rail, and a dust proof seal attached onto the slide block and having a soft rubber member for engaging with the guide rail and for making a tight seal between the slide block and the guide rail and for wiping off the dust or particles or the like that may be engaged into the space formed between the slide block and the guide rail.

However, similarly, the dust proof seal is normally solidly secured onto an end cap or the slide block with four or more fasteners, and it takes a long time to fasten and to unfasten the fasteners onto and from the dust proof seal. In addition, the dust proof seals may only be attached or engaged onto the guide rail from the end portion of the guide rail.

U.S. Pat. No. 7,121,724 to Lee et al. discloses a further typical linear motion rolling guide device also comprising a slider or slide block slidably attached onto a guide rail, and a wiper member attached onto the slide block and having a soft rubber member for engaging with the guide rail and for making a tight seal between the slide block and the guide rail, and a frame provided for receiving or securing the end caps and the wiper members.

However, the wiper members and the end caps are required to be received and secured in the frame, such that the end caps and the wiper members also may only be attached or engaged onto the guide rail from the end portion of the guide rail, and the wiper members may not be easily and quickly attached or engaged onto the end caps.

The present invention has arisen to mitigate and/or obviate the afore-described disadvantages of the conventional linear motion guide devices.

SUMMARY OF THE INVENTION

The primary objective of the present invention is to provide a linear motion guide apparatus including a wiper designed and arranged to be easily and readily attached to or disengaged from the linear motion guide apparatus without additional tools.

In accordance with one aspect of the invention, there is provided a linear motion guide apparatus comprising a guide rail, a slider slidably attached onto the guide rail for moving along the guide rail, two end caps attached to the slider, a wiper device including two wiping members to be detachably attached to each of the end cap, and a securing device for securing the wiping members to the end cap.

The securing device includes at least one projection extended from each of the wiping members for engaging with the end cap and for anchoring and positioning the wiping members to the end cap. The end cap includes at least one cavity formed therein for engaging with the projection of each of the wiping members.

The end cap includes a rib extended therefrom and having the cavity formed in the rib. The end cap includes a hub provided in the rib for attaching a mouth. The wiping members each include a depression formed therein for receiving the hub and for anchoring the wiping members to the end cap.

The end cap includes a space formed therein and defined by an outer peripheral wall for receiving the wiping members of the wiper device. The rib of the end cap may separate the space of the end cap into two chambers and for receiving the wiping members respectively.

The wiping members of each of the wiper devices each include at least one latch extended therefrom for engaging with the end cap and for detachably anchoring and positioning the wiping members of the wiper device to the end cap without tools. The end cap includes an outer peripheral wall having two notches formed therein for receiving and engaging with the latch of the wiping members.

The end cap includes at least one stop extended into each of the compartments thereof for engaging with the latch of the wiping members. The wiping members each include a catch extended from the latch for engaging with the end cap.

The wiping members each include a hand grip extended from the latch for being depressed by a user. The wiping members each include a compartment formed therein and the latch is provided within the compartment of each of the wiping members.

The wiping members each include a wiping portion attached to an inner peripheral portion thereof and made of soft materials for resiliently engaging with the guide rail. The wiping portion includes a groove formed in an inner peripheral portion of the wiping portion for forming an inner peripheral flange.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 5, 6, 7 are enlarged partial perspective views similar to FIG. 4, illustrating the operation of the linear motion guide apparatus;

DETAILED DESCRIPTION OF THE PREFERRED EMBODIMENT

Figure 1:
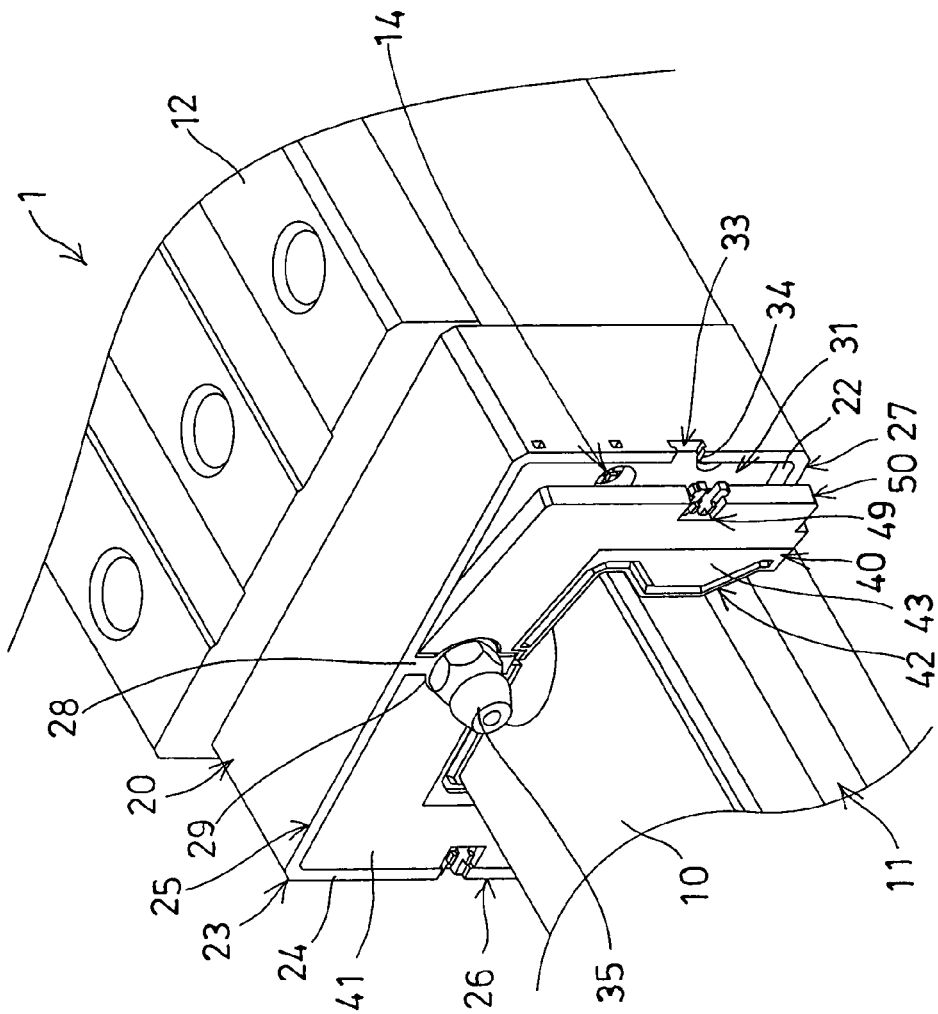
FIG. 1 is a partial perspective view of a linear motion guide apparatus in accordance with the present invention.
Figure 2:
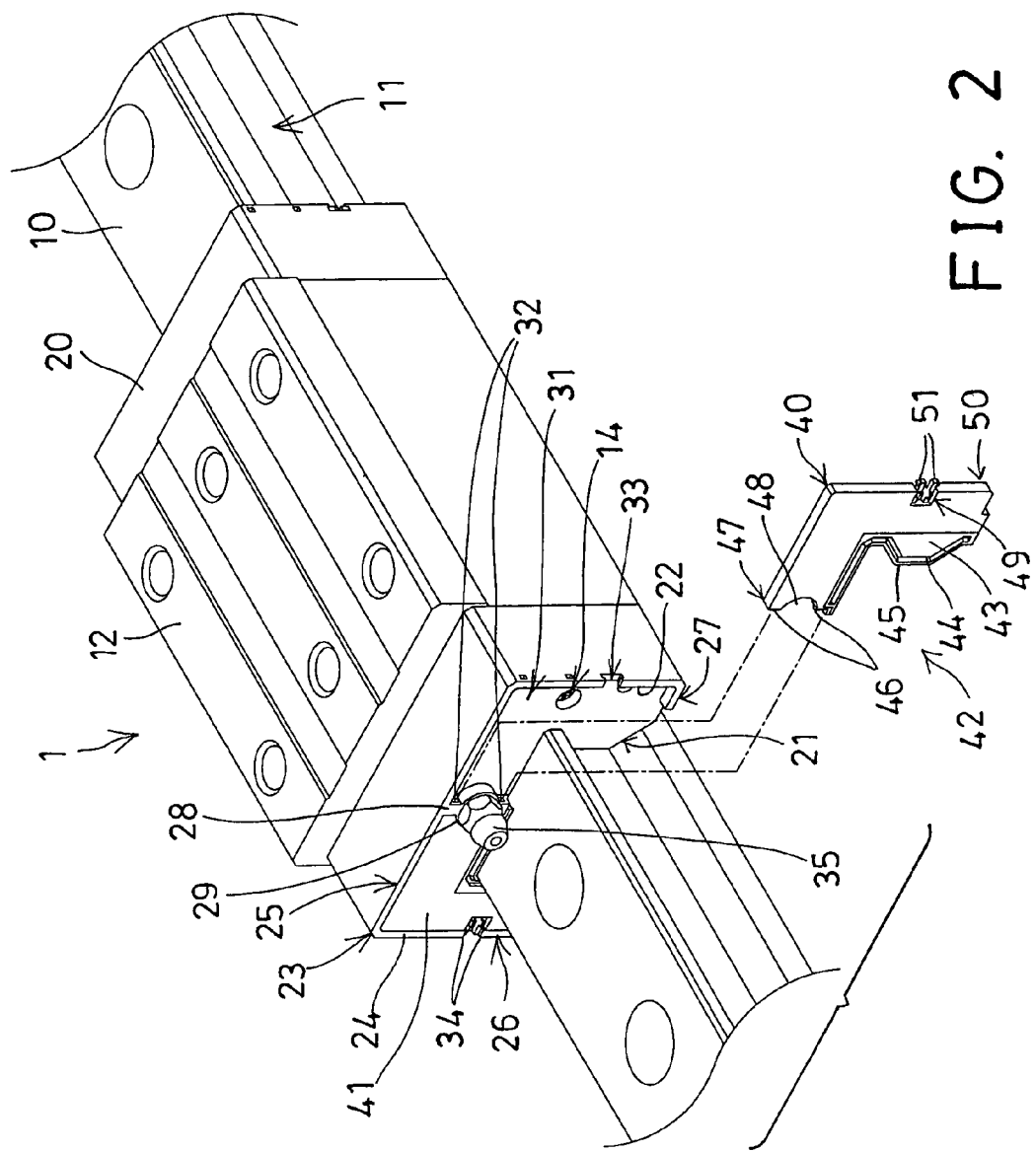
FIG. 2 is a partial exploded view of the linear motion guide apparatus.
Figure 3:
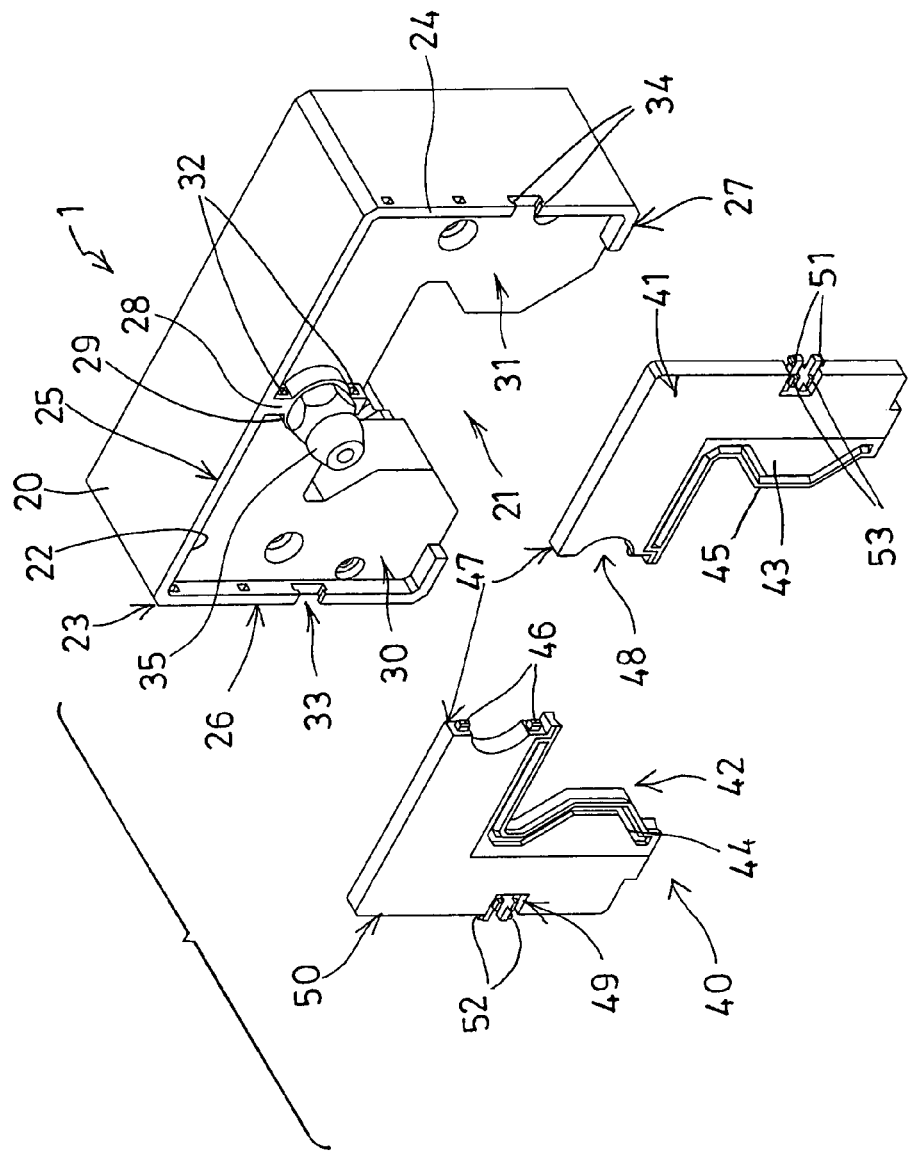
FIG. 3 is another partial exploded view of the linear motion guide apparatus.

Referring to the drawings, and initially to FIGS. 1-3, a linear motion guide apparatus 1 in accordance with the present invention comprises a guide rail 10 including a substantially I-shaped cross section having two longitudinal recesses 11 formed in the side portions thereof, and a slide block or a slider 12 slidably attached onto the guide rail 10 and arranged to be moved along the guide rail 10, and normally, a ball bearing device (not shown) disposed between the slider 12 and the guide rail 10 for facilitating the sliding movement between the slider 12 and the guide rail 10 and for allowing the slider 12 and the guide rail 10 to be smoothly moved relative to each other. Two end caps 20 are disposed on the two sides or end portions or outer portions of the slider 12 and attached or secured to the slider 12 with such as fasteners 14 (FIGS. 1, 2) respectively.

The linear motion guide apparatus 1 in accordance with the present invention further includes two dust caps or wiper devices 40 disposed on the outer portions of the end caps 20 and to be detachably attached or secured onto the end caps 20 without additional tools. The ball bearing device (not shown) and the slider 12 are not related to the present invention and will not be described in further details. The end caps 20 each include a channel 21 formed in the lower portion thereof (FIGS. 2, 3) for slidably receiving or engaging onto the guide rail 10, and a space 22 formed therein, such as formed in the outer portion 23 thereof that faces away from the slider 12 or distal to the slider 12, and formed and defined by an outer peripheral wall 24 which includes an upper segment 25 and two side segments 26 and two lower segments 27.

The end caps 20 each further include a rib 28 extended downwardly from the middle portion of the upper segment 25 and extended toward the channel 21 of the end cap 20, and an enlarged hub 29 formed or provided in the middle portion of the rib 28 for allowing the space 22 of the end cap 20 to be separated into two separated chambers 30, 31 by the rib 28 and/or the hub 29, and one or more (such as two) cavities 32 formed in each side of the rib 28 and communicating with the respective chamber 30, 31 and preferably located on two sides of the hub 29, or the cavities 32 of the end cap 20 are separated from each other by the hub 29, and one or more (such as two) notches 33 formed in the outer peripheral wall 24, such as formed in the two side segments 26 of the outer peripheral wall 24 respectively.

The end caps 20 each further include one or more (such as two) pegs or stops 34 oppositely extended into the respective notch 33 of the end cap 20 for allowing the notches 33 to be formed into the substantially C-shaped structure or to be formed and acted as a lock notch 33. A mouth 35 may be attached to each of the end caps 20, such as attached to the hub 29 of the end cap 20 for filling a lubricant into the end caps 20 and for lubricating the ball bearing device (not shown). The structure of the mouth 35 is also not related to the present invention and will not be described in further details. The dust caps or wiper devices 40 are to be detachably attached or secured on the outer portions of the end caps 20 and/or into the chambers 30, 31 or the space 22 of the end caps 20 respectively without additional tools.

The wiper device 40 for each of the end caps 20 includes two wiping members 41 each having a substantially C or L-shaped structure for engaging into the respective chambers 30, 31 of the end cap 20 and for arranged for allowing the wiping members 41 to form a substantially inverted U-shaped structure, and for allowing the wiper device 40 to also include a channel 42 formed in the lower portion thereof and having a shape corresponding to that of the guide rail 10 for slidably receiving the guide rail 10 and for snugly and softly or resiliently engaging onto the guide rail 10. The wiping members 41 of the wiper device 40 each include a wiping portion 43 attached to or formed in the inner peripheral portion thereof and for softly or resiliently engaging with the guide rail 10 and for wiping off the dust or particles or the like that may be engaged into the space formed between the slide block 12 and the guide rail 10. It is preferable that the wiping portions 43 are preferably made of the plastic or soft or rubber materials softer than that for the wiping members 41.

As shown in FIGS. 2, 3, the wiper devices 40 each include a groove 44 formed in the inner peripheral portion thereof for forming or defining an inner peripheral flange 45 and for forming a resilient structure to further softly or resiliently engaging with the guide rail 10. The wiping members 41 each include one or more (such as two) projections 46 extended therefrom, such as extended from one end or inner end portion 47 thereof for engaging into the corresponding or the respective cavities 32 of the end cap 20 and for anchoring and positioning the inner end portions 47 of the wiping members 41 to the end cap 20 and for preventing the wiping members 41 from being disengaged from the end cap 20. The wiping members 41 each further include a depression 48 formed in the inner end portion 47 thereof and preferably located between the projections 46 for receiving the hub 29 and for further anchoring and positioning the inner end portions 47 of the wiping members 41 to the end cap 20.

The wiping members 41 each further include a compartment 49 formed in the other end or the outer portion 50 thereof, and one or more (such as two) spring or resilient arms or latches 51 extended therefrom, such as extended from the other end or the outer portion 50 thereof or provided within the compartment 49 of each of the wiping members 41 and partially extended out of the compartment 49 of the wiping member 41 and partially extended out beyond the outer portion 50 of the wiping member 41 and for engaging into the corresponding lock notch 33 of the end cap 20 (FIGS. 4-5) and for selectively engaging with the stops 34 of the end cap 20 and thus for detachably anchoring and positioning the outer portion 50 of the wiping members 41 to the end cap 20. The outer portion 50 of the wiping members 41 may be selectively disengaged form the end cap 20 when the latches 51 are depressed and disengaged form the stops 34 of the end cap 20 (FIGS. 6, 7).

It is preferable that the wiper devices 40 further include a catch 52 formed or extended from each of the latches 51 of the respective wiping members 41 for selectively engaging the stops 34 or the end cap 20 (FIGS. 4-7) and thus for further detachably anchoring and positioning the outer portion 50 of the wiping members 41 to the end cap 20. The latches 51 and/or the catches 52 of the wiping members 41 may be disengaged form the stops 34 and/or the end cap 20 by depressing such as the latches 51. It is preferable that the latches 51 each further include a protrusion or hand grip 53 extended therefrom, such as laterally extended from the latches 51 respectively for being depressed by the users and for allowing the latches 51 and/or the catches 52 to be easily or suitably depressed and disengaged form the stops 34 and/or the end cap 20 and thus for allowing the wiping members 41 of the wiper device 40 to be selectively latched to or disengaged from the end cap 20 by the resilient latches 51 without additional tools or fasteners.

Figure 5:
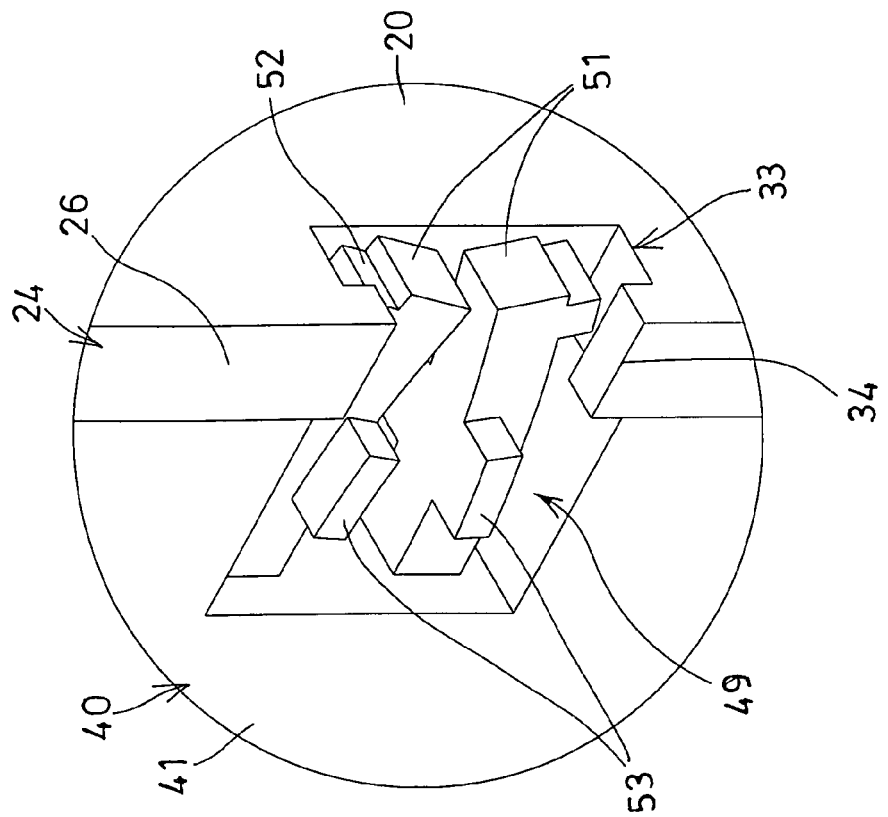
Figure 4:
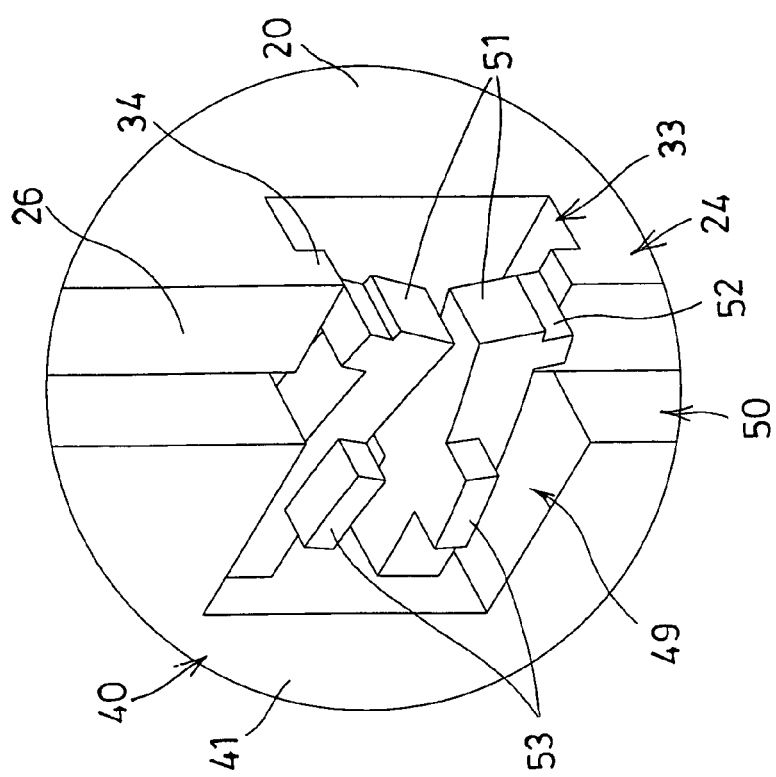
FIG. 4 is an enlarged partial perspective view of the linear motion guide apparatus.
Figure 8:
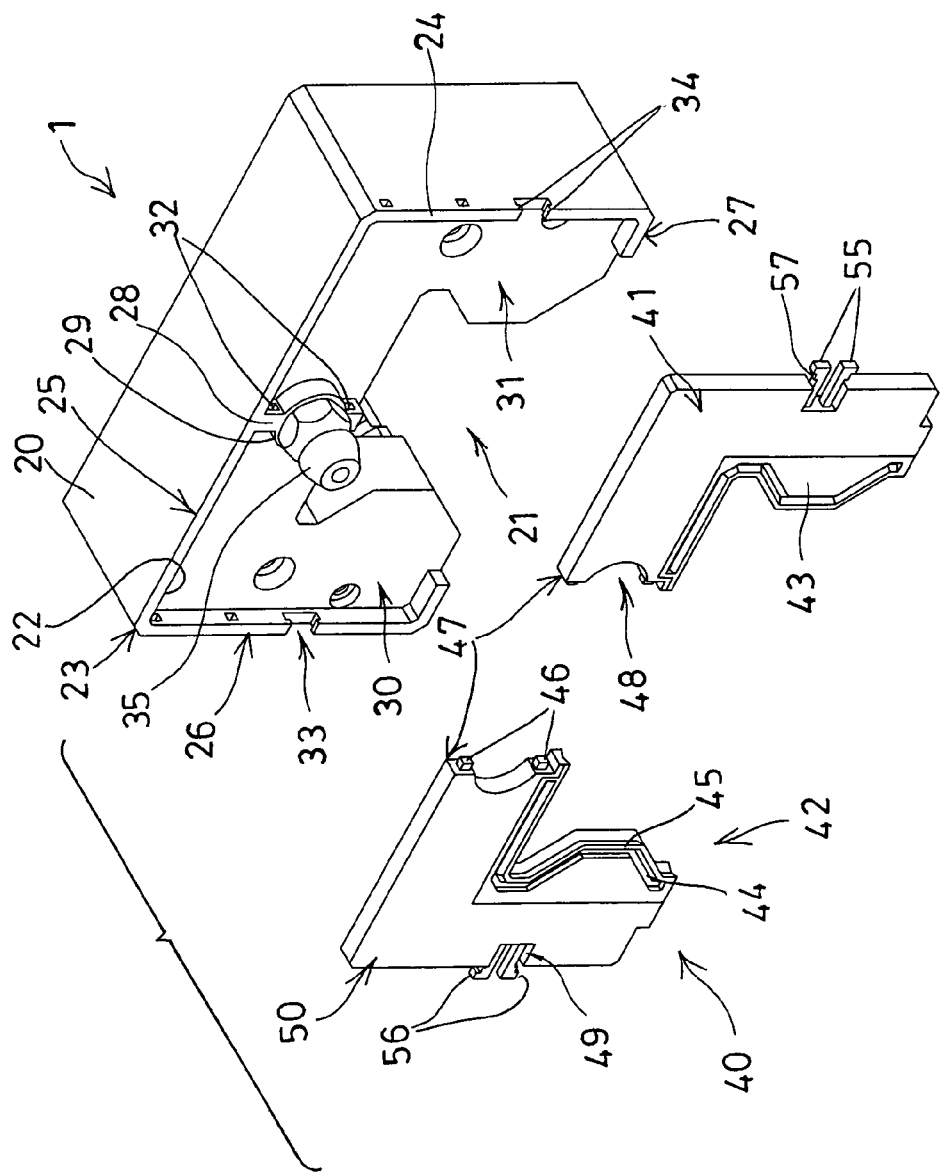
FIG. 8 is a partial exploded view similar to FIG. 3, illustrating the other application of the linear motion guide apparatus.
Figure 10:
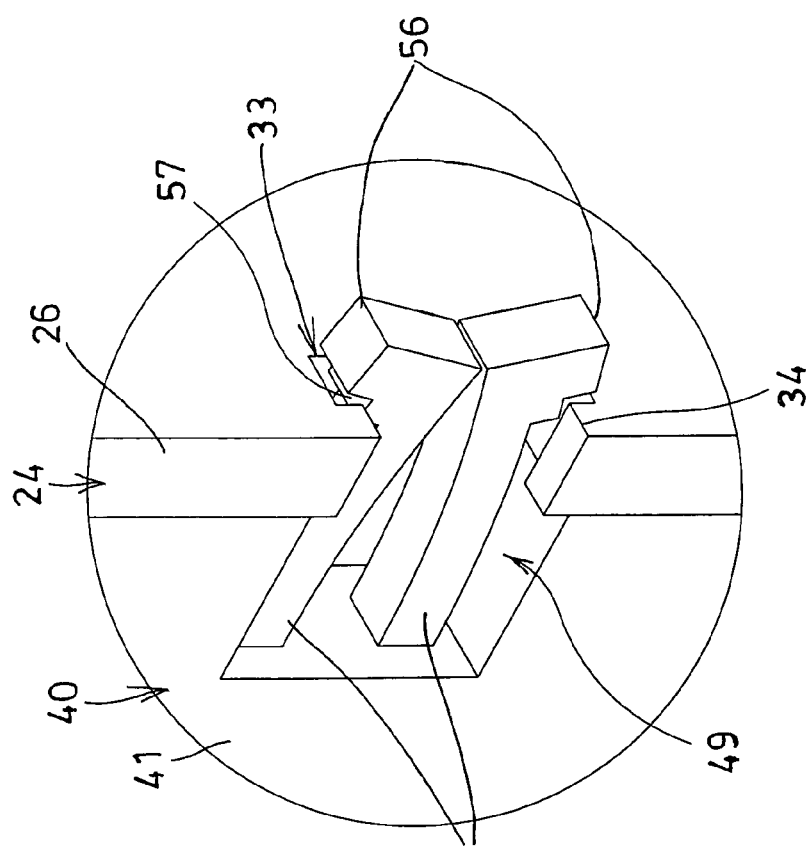
FIGS. 10, 11, 12 are enlarged partial perspective views similar to FIG. 9, illustrating the operation of the linear motion guide apparatus as shown in FIGS. 8 and 9.
Figure 9:
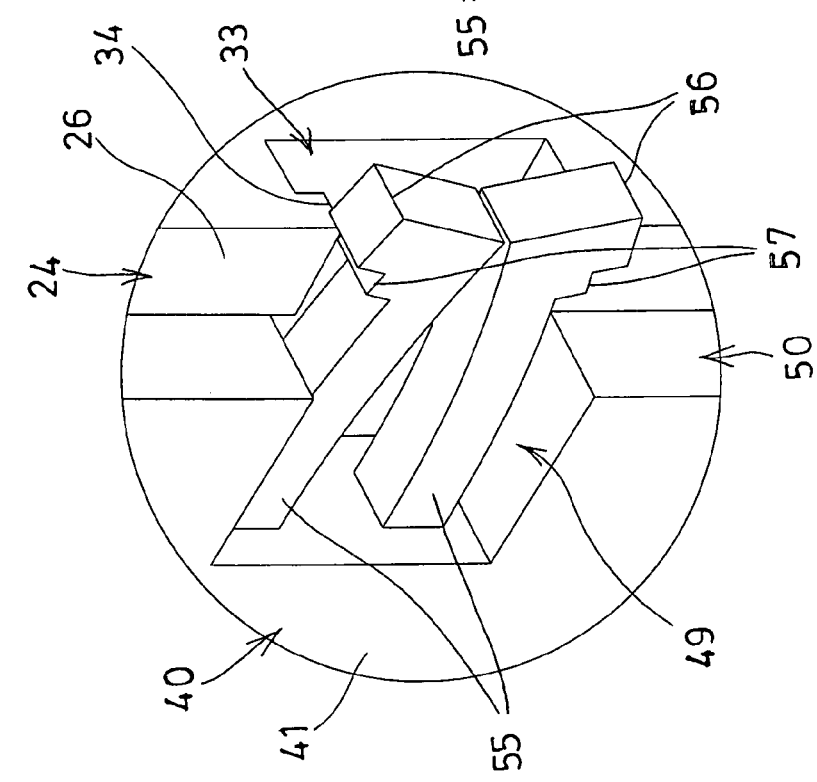
FIG. 9 is an enlarged partial perspective view of the linear motion guide apparatus as shown in FIG. 8.
Figures 11, 12:
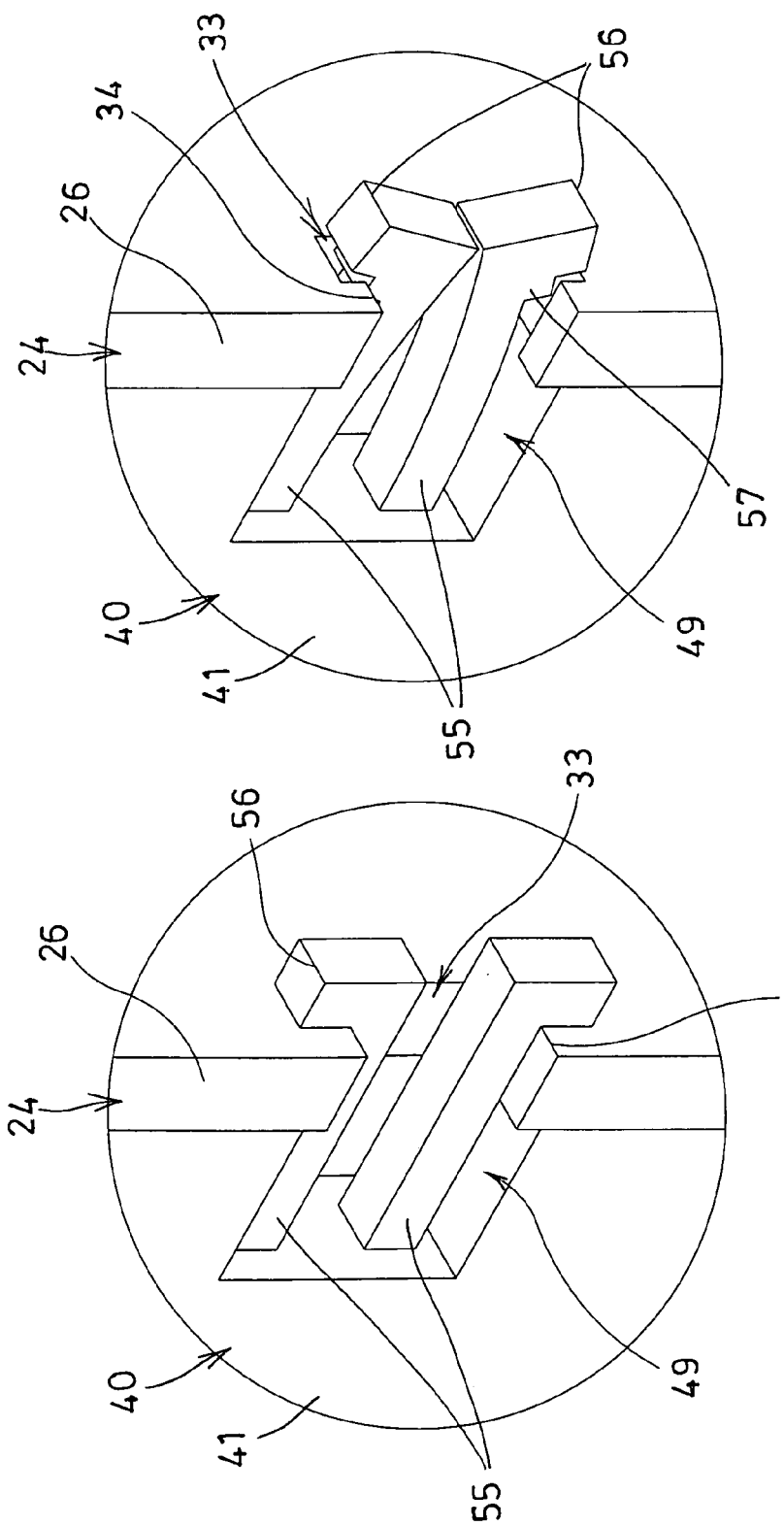

In operation, as shown in FIGS. 1 and 2, the projections 46 of the wiping members 41 may first be engaged into the corresponding or the respective cavities 32 of the end cap 20 in order to anchor and position the inner end portions 47 of the wiping members 41 to the end cap 20. As shown in FIGS. 4 and 5, the latches 51 and/or the catches 52 of the wiping members 41 may then be engaged into the corresponding lock notch 33 of the end cap 20 and/or engaged with the stops 34 of the end cap 20 for solidly anchoring and positioning the outer portion 50 of the wiping members 41 to the end cap 20 and thus for selectively latching or disengaging the wiping members 41 from the end cap 20 without additional tools or fasteners. The wiping members 41 may be easily and quickly changed for the other ones or the new ones when the wiping portions 43 of the wiping members 41 have been worn out.

Alternatively, as shown in FIGS. 8-12, two dust caps or wiper devices 40 are also provided and to be detachably attached or secured onto each of the end caps 20 without additional tools. The end caps 20 each also include a space 22 formed in the outer portion 23 thereof and formed and defined by an outer peripheral wall 24 which includes an upper segment 25 and two side segments 26 and two lower segments 27, a rib 28 extended downwardly from the middle portion of the upper segment 25, and an enlarged hub 29 formed or provided in the middle portion of the rib 28 for allowing the space 22 of the end cap 20 to be separated into two separated chambers 30, 31 by the rib 28 and/or the hub 29, and one or more (such as two) cavities 32 formed in each side of the rib 28 and communicating with the respective chamber 30, 31 of the end cap 20, and one or more (such as two) notches 33 formed in the outer peripheral wall 24, and one or more (such as two) pegs or stops 34 oppositely extended into the respective notch 33 of the end cap 20.

The wiper device 40 for each of the end caps 20 also includes two wiping members 41 each having a substantially C or L-shaped structure for engaging into the respective chambers 30, 31 of the end cap 20, and each having a soft or resilient wiping portion 43 for softly or resiliently engaging with the guide rail 10, and each having one or more (such as two) projections 46 for engaging into the respective cavities 32 of the end cap 20, and each having a compartment 49 formed in the outer portion 50 thereof, and one or more (such as two) spring or resilient arms or latches 55 extended from the outer portion 50 thereof or provided within the compartment 49 of each of the wiping members 41 and partially extended out of the compartment 49 of the wiping member 41 and partially extended out beyond the outer portion 50 of the wiping member 41 and for engaging into the corresponding lock notch 33 of the end cap 20 (FIGS. 9-10) and for selectively engaging with the stops 34 of the end cap 20 and thus for detachably anchoring and positioning the outer portion 50 of the wiping members 41 to the end cap 20.

The latches 55 may also be extended out of the side segments 26 of the outer peripheral wall 24 (FIGS. 9-12) for being easily depressed by the users, a catch 56 may further be formed or extended from each of the latches 55 of the respective wiping members 41 for selectively engaging the stops 34 or the end cap 20 (FIGS. 9-12) and thus for further detachably anchoring and positioning the outer portion 50 of the wiping members 41 to the end cap 20. The outer portion 50 of the wiping members 41 may also be selectively disengaged form the end cap 20 when the latches 55 and/or the catches 56 are depressed and disengaged form the stops 34 of the end cap 20 (FIGS. 11, 12), i.e., the latches 55 and/or the catches 56 of the wiping members 41 may be disengaged form the stops 34 and/or the end cap 20 by depressing such as the latches 55 and/or the catches 56. It is preferable that the latches 55 each further include a protrusion 57 extended therefrom, such as located beside the catches 56 for selectively engaging with the stops 34 or the end cap 20.

It is to be noted that the wiper devices 40 each include two wiping members 41 for easily engaging into the chambers 30, 31 of the end cap 20 and for easily and readily and quickly attached to or disengaged from the respective end cap 20 by the catches 52 and/or the latches 51 of the wiper device 40 without additional tools. It is further to be noted that the wiper devices of the typical linear motion rolling guide devices comprise an integral and inverted U-shaped structure that may not be easily attached or engaged onto the guide rail and the end caps, i.e., the typical linear motion rolling guide devices failed to provide a wiper device having two wiping members for easily attaching or securing onto the guide rail and/or the end cap. The projections 46 and the latches 51 and/or the catches 52 of the wiping members 41 may thus be formed and acted as a locking or latching or securing means for anchoring and positioning or securing or locking the wiping members 41 to the end cap 20 and for selectively disengaging the wiping members 41 from the end cap 20 without additional tools or fasteners.

Accordingly, the linear motion guide apparatus in accordance with the present invention includes a wiper device having two wiping members designed and arranged to be easily and readily attached to or disengaged from the guide rail and/or the end cap without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
    a guide rail,
    a slider slidably attached onto said guide rail for moving along said guide rail,
    two end caps attached to said slider,
    a wiper device including two wiping members to be detachably attached to each of said end cap, and
    means for securing said wiping members to said end cap.

2. The linear motion guide apparatus as claimed in claim 1, wherein said securing means includes at least one projection extended from each of said wiping members for engaging with said end cap and for anchoring and positioning said wiping members to said end cap.

3. The linear motion guide apparatus as claimed in claim 2, wherein said end cap includes at least one cavity formed therein for engaging with said at least one projection of each of said wiping members.

4. The linear motion guide apparatus as claimed in claim 3, wherein said end cap includes a rib extended therefrom and having said at least one cavity formed in said rib.

5. The linear motion guide apparatus as claimed in claim 4, wherein said end cap includes a hub provided in said rib for attaching a mouth.

6. The linear motion guide apparatus as claimed in claim 5, wherein said wiping members each include a depression formed therein for receiving said hub and for anchoring said wiping members to said end cap.

7. The linear motion guide apparatus as claimed in claim 1, wherein said end cap includes a space formed therein and defined by an outer peripheral wall for receiving said wiping members of said wiper device.

8. The linear motion guide apparatus as claimed in claim 7, wherein said end cap includes a rib extended therefrom for separating said space of said end cap into two chambers and for receiving said wiping members respectively.

9. The linear motion guide apparatus as claimed in claim 1, wherein said wiping members of each of said wiper devices each include at least one latch extended therefrom for engaging with said end cap and for detachably anchoring and positioning said wiping members of said wiper device to said end cap without tools.

10. The linear motion guide apparatus as claimed in claim 9, wherein said end cap includes an outer peripheral wall having two notches formed therein for receiving and engaging with said at least one latch of said wiping members.

11. The linear motion guide apparatus as claimed in claim 10, wherein said end cap includes at least one stop extended into each of said compartments thereof for engaging with said at least one latch of said wiping members.

12. The linear motion guide apparatus as claimed in claim 9, wherein said wiping members each include a catch extended from said at least one latch for engaging with said end cap.

13. The linear motion guide apparatus as claimed in claim 9, wherein said wiping members each include a hand grip extended from said at least one latch for being depressed by a user.

14. The linear motion guide apparatus as claimed in claim 9, wherein said wiping members each include a compartment formed therein and said at least one latch is provided within said compartment of each of said wiping members.

15. The linear motion guide apparatus as claimed in claim 1, wherein said wiping members each include a wiping portion attached to an inner peripheral portion thereof and made of soft materials for resiliently engaging with said guide rail.

16. The linear motion guide apparatus as claimed in claim 15, wherein said wiping portion includes a groove formed in an inner peripheral portion of said wiping portion for forming an inner peripheral flange.

\* \* \* \* \*